United States Patent [19]
Veale

[11] 3,805,836
[45] Apr. 23, 1974

[54] FLUID PRESSURE RESPONSIVE POSITION CONTROL

[76] Inventor: Charles C. Veale, 950 Canyon View Dr., Laguna Beach, Calif. 92651

[22] Filed: Oct. 24, 1972

[21] Appl. No.: 299,993

Related U.S. Application Data
[60] Division of Ser. No. 133,197, April 12, 1971, which is a continuation-in-part of Ser. No. 642,285, May 23, 1967.

[52] U.S. Cl............ 137/625.4, 91/51, 137/90, 137/334, 236/12 A
[51] Int. Cl............................................. F16k 19/00
[58] Field of Search ............... 91/48, 51; 236/12 A; 137/85, 90, 98, 100, 625.4, 625.61, 625.64

[56]           References Cited
              UNITED STATES PATENTS

| | | | |
|---|---|---|---|
| 2,835,265 | 5/1958 | Brandstadter................. | 91/51 X |
| 2,973,746 | 3/1961 | Jupa....................... | 137/625.64 X |
| 2,272,403 | 2/1942 | Fields...................... | 236/12 A |
| 2,449,766 | 9/1948 | Brown...................... | 137/90 X |
| 2,780,412 | 2/1957 | Holley..................... | 137/625.4 X |

Primary Examiner—Robert G. Nilson
Attorney, Agent, or Firm—Grover A. Frater

[57] ABSTRACT

Position control is accomplished in an hydraulic controller of the bridge type. The bridge includes an output element whose position is controlled as a function of bridge unbalance. In preferred form, the output element comprises a piston or spool reciprocal within a cavity. The cavity extends across one diagonal of the bridge and the fluid pressure source and drain are connected across the other set of diagonals. The bridge is unbalanced by altering flow in one leg and it is rebalanced by utilizing displacement of the output element to alter flow in another leg. In preferred form, the output element carries a tapered plug which is moved relative to a flow orifice to change the flow-path area through the control leg orifice as a function of output element position.

4 Claims, 4 Drawing Figures

PATENTED APR 23 1974 3,805,836
SHEET 1 OF 2
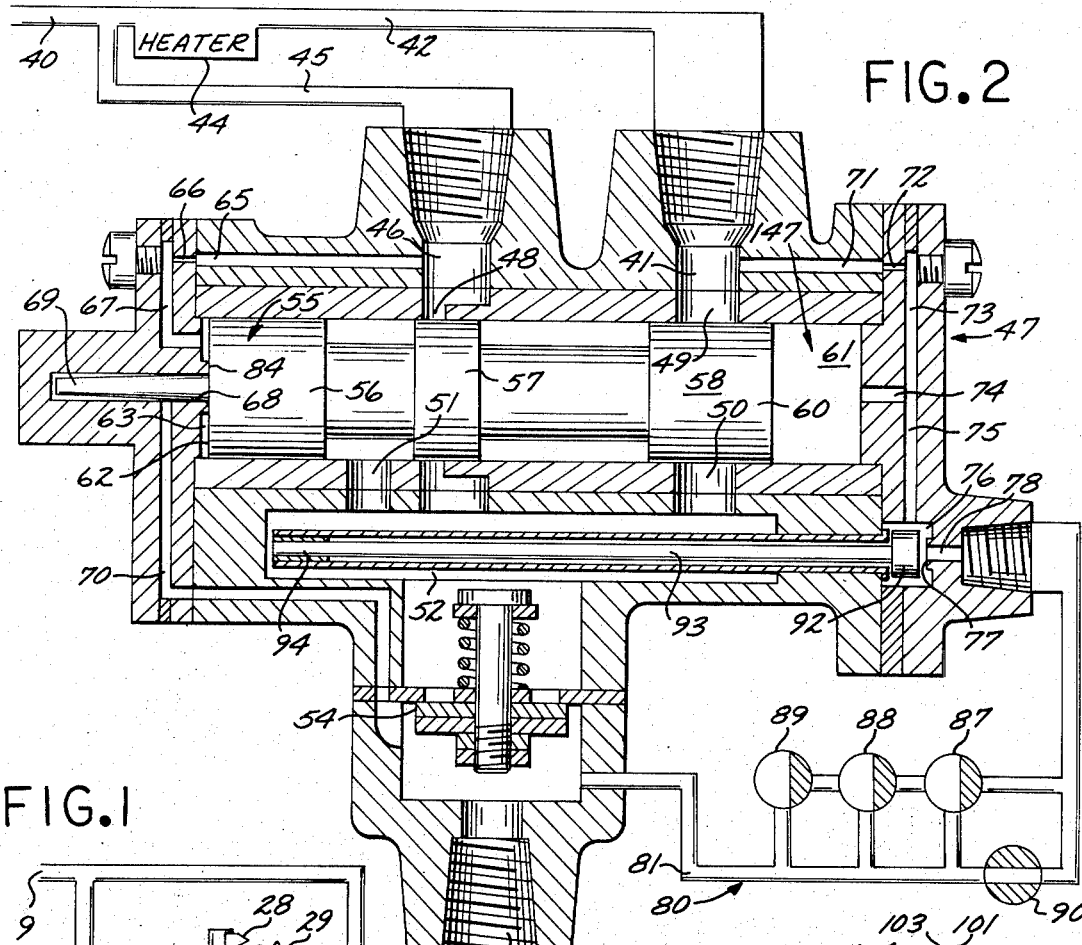
FIG.2
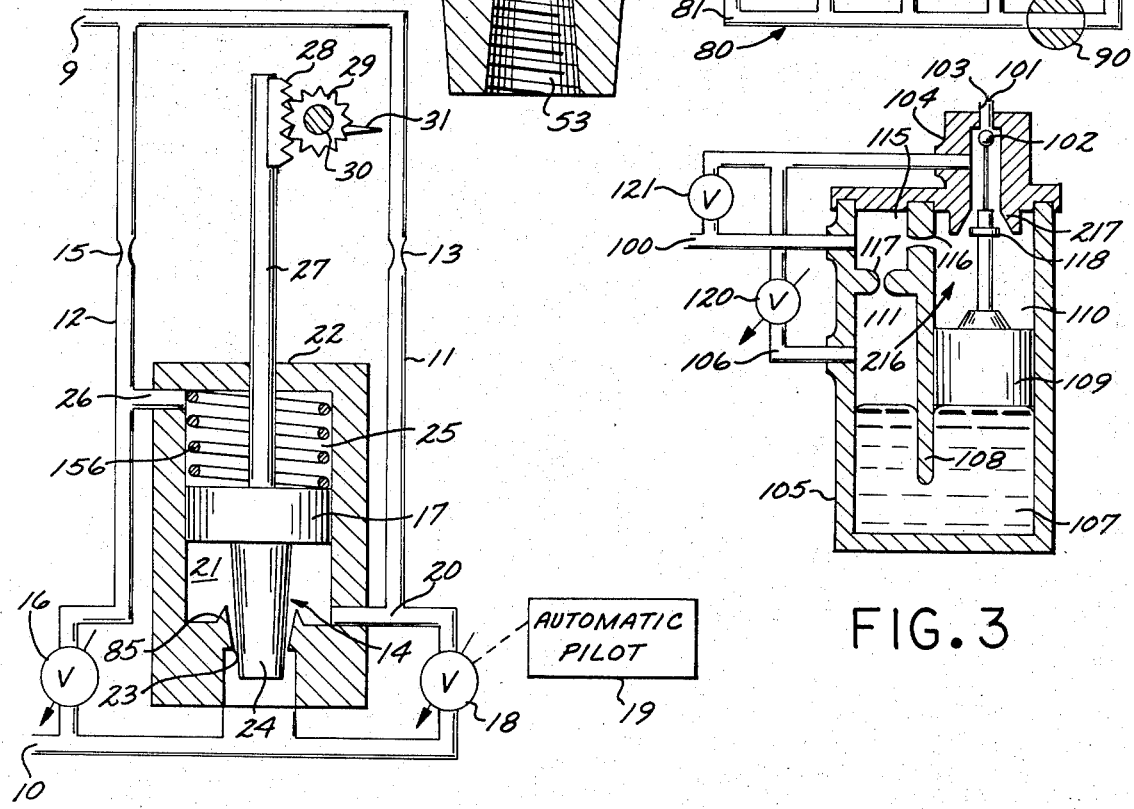
FIG.1
FIG.3

FLUID PRESSURE RESPONSIVE POSITION CONTROL

This invention relates to improvements in fluid control systems and particularly to a fluid pressure responsive position controller for said systems and this application is a division of my application Ser. No. 133,197, filed Apr. 12, 1971, which in turn is a continuation-in-part of my application Ser. No. 642,285, filed May 23, 1967.

It is an object of the invention to provide improved pressure responses control systems and to provide an improved pressure responsive position control apparatus for such systems.

The invention makes use of an hydraulic bridge such, for example, as a Wheatstone Bridge. Any bridge arrangement is suitable provided that bridge unbalance is represented by a pressure differential and provided that there are at least two legs in which a change in flow rate will alter bridge balance. The pressure differential occasioned by imbalance in the bridge is applied to alter the position of an output member and the position of that member is employed to alter the flow in one leg of the bridge. As a consequence, altering the flow rate in some leg of the bridge results in imbalance and repositioning of the output element to a point at which flow rate to the leg which it controls is altered to rebalance the bridge. The result is that an action that that alters flow in one leg of the bridge results in changing the position of an output element. The output element is made to do the work which is the purpose of apparatus to accomplish. That work may be the operation of proportioning valves or the operation of a flow rate control valve or the rotation of a boat rudder. Repositioning of the output element can be made to accomplish many other kinds of useful work but the invention is particularly useful in performing the specific tasks mentioned because of another feature of the invention.

That feature is included in the preferred form of apparatus embodying the invention. It includes an arrangement in which the output element is moved to an extreme position when flow in a controlling leg is shut off. In that extreme position the output element shuts off all flow through the bridge. Thus, the same input signal element that is used to change output element position by degrees is also used to shut down the system entirely. This feature makes an apparatus embodying the invention useful in applications where the user has no technical skill and simplified user controls are desired. It is an object of the invention to provide such an apparatus.

The operating simplicity of controllers and systems employing the invention makes them useful for such proportioning control applications as the mixing of hot and cold water to maintain a pre-selected temperature at any flow level that a user selects. It provides a controller for operating a boat rudder remotely using a single, simple fluid control. The provision of an improved proportioning controller and an improved rudder controller are two of the specific objects of the invention.

Another advantage of the invention is that more than one control variable can be accommodated easily and usually inexpensively. The temperature control problem in which output water temperature is to be controlled notwithstanding changes in flow rate is one example. Rudder control offers another example in that the controller permits simultaneous control of rudder position by an automatic pilot with manual readjustment or override. While it has been possible to perform these tasks in previous systems, an object of this invention is to provide a means for doing it more reliably and less expensively than has heretofore been possible.

In the drawings:

FIG. 1 is a schematic diagram of a hot and cold water proportioning system shown schematically;

FIG. 2 is a schematic diagram of a boat rudder control system;

FIG. 3 is a schematic diagram of a gas flow controller;

Figure 4:
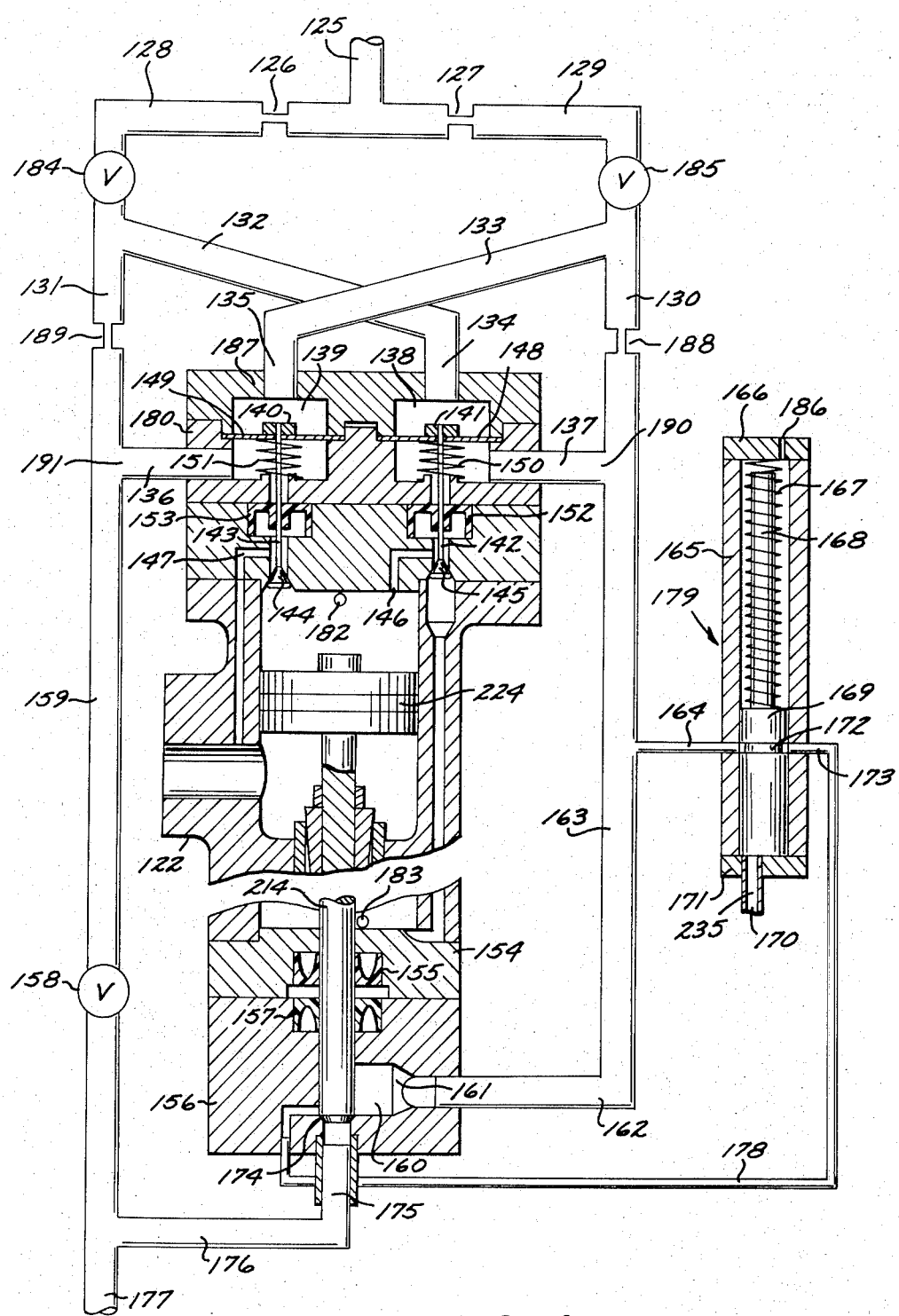
FIG. 4 is an alternative form of flow rate controller shown schematically.

The invention employs an hydraulic bridge as is most easily understood from an examination of FIG. 1. That FIGURE includes an inlet 9 for connection to a source of pressurized hydraulic fluid and it includes a drain conduit 10 for connection to drain or sump of a hydraulic fluid source system. The inlet 9 conducts fluid to two flowpaths connected in parallel from the inlet to the outlet. The first of these flowpaths is designated 11 and the second flowpath is designated 12. Two flow restrictors are included in each flowpath. The first restrictor 13 and the second restrictor 14 are included in series, in that order, in the first flowpath between the inlet and the outlet. A third restrictor 15 and a fourth restrictor 16 are included, in that order, in the second flowpath between the inlet 9 and outlet 10. The system includes an output element 17 and it includes means for displacing that output element from one position to another in accordance with the difference in the fluid pressure between the first and second flowpaths measured from a point between the first and second restrictors of the first flowpath and a point between the third and fourth restrictors of the second flowpath. Restrictors 15 and 13 are represented as constrictions in the flowpaths. They comprise resistances to fluid flow that have fixed value. The fourth restrictor 16 is represented as a valve which can be opened in varying degree and constitutes a variable resistance to flow.

At the lower right-hand corner of FIG. 1, the valve 18 is a flow restrictor that is operated by an automatic pilot 19. Flow restrictors 14 and 18 are connected in parallel flowpaths. There is interaction between them but the valve 18 is optional whereas the restriction 14 is not optional in this system. Flow proceeds from inlet 9 through restriction 13 along the flowpath to the junction 20 and from there to the lower chamber 21 of the cylinder and piston assembly. From that chamber it flows through an orifice 23 past a tapered plug 24 to the outlet 10. The upper chamber 25 of the cylinder is connected at point 26 to the second flowpath 12. The output member is a spool or piston 17. It is free to reciprocate up and down within the cylinder 22 and it is moved when there is a pressure differential measured from chamber 21 to chamber 25. Thus, piston 17 is moved when the pressure in flowpath 11, at a point between restrictors 13 and 14, is different from the pressure in flowpath 12, at a point between restrictors 15 and 16.

Restriction 14 is variable in that the size of the orifice 23 is fixed whereas plug 24 is tapered along its length. The cross-sectional area of the flowpath through the orifice is variable with the degree in which the plug is inserted in the orifice. Inserted sufficiently, all flow is stopped. The invention includes a restriction varying means which comprises the connection from the output element to one of the variable restrictors. In this case that restriction varying means comprises a connection from the piston 17 to the plug 24. In fact, the plug is fixed to and carried by the piston. Of course the orifice could be "connected" to the piston and movable with it and the plug could be carried by the cylinder.

Initially it is assumed that valve 18 is fully closed and that spring 15 is omitted so that the bridge circuit simply comprises the two parallel first and second flowpaths from the common inlet 9 to the common outlet 10. The "diagonal" across the bridge is formed by the cylinder 22, chamber 25 of which is connected to point 26 in the second flowpath and chamber 21 of which is connected to point 20 in the first flowpath. When the bridge is balanced the pressure in chambers 21 and 25 are equal and the piston 17 remains in whatever position it had when those pressures became equal. Neglecting the effect of spring 156, the pressures in chamber 21 and 25 will be equal whenever the flow through the first flowpath equals the flow through the second flowpath. If the valve 16 is operated to change its resistance to flow, the flow through the second flowpath, and therefore the pressure at point 26 and the chamber 25, will be changed and will be different than the pressure in chamber 21 and point 20 of the first flowpath. The resulting pressure differential across piston 17 causes it to move but as it moves the tapered plug 24 is moved relative to orifice 23 so that the area of the flowpaths through that orifice is altered. When it is altered sufficiently to change the flow rate in the first flowpath 11 such that the pressure at point 20 and in chamber 21 equals the pressure in chamber 25, then the pressure differential will have been overcome and the piston 17 will stop moving.

The piston is provided with a piston rod 27 which carries a rack 28 operatively engaged with a gear 29 mounted upon the shaft 30 of a rudder 31. Opening or closing valve 16 results in displacement of piston 17 from one position to another which results in movement of the rack and gear set 28 and 29 to rotate the rudder shaft 30 and rudder 31.

In this bridge circuit there is no flow past the piston 17. In that circumstance the bridge is balanced only when the ratio of the resistance of restrictor 16 to the resistance of restrictor 15 is equal to the ratio of the resistance of restrictor 13 to the resistance of restrictor 14. When restrictor valve 18 is open, the bridge is balanced only when the resistance of restrictor 16 is to the resistance of restrictor 15 as the resistance of restrictor 13 is to the combined resistance of restrictors 14 and 18. When valve 18 is open in greater degree restrictor 14 must be closed in greater degree by movement of plug 24 downwardly into the orifice 23.

It is well known that the variable restrictor elements can be located in different legs of the bridge and that even greater flexibility can be had in placement of restrictor elements if a small flow is permitted past piston 17. Another variation which is well known is the introduction of a mechanical or, less often, a magnetic bias applied to urge the output element in one direction. The embodiment of FIG. 1 includes a compression spring 156 which is trapped between the upper end of cavity 125 and the upper face of piston 17. The spring urges the piston down along with the fluid pressure in chamber 25. The effect is to shift the range of pressure change in chamber 25. It will be apparent that the second flowpath can be eliminated entirely if neither of the restrictor 15 and 16 need be varied. In such a case the spring 156 is the equivalent of the second flowpath and its restrictors 15 and 16 except that the taper of plug 24 would be reversed. The unit is still called a bridge.

The system shown in FIG. 2 illustrates a proportioning application for the invention. Cold water entering inlet 40 is conducted to a cold water supply passageway 46 by a pipe 45. Additional quantities of cold water entering at inlet 40 are conducted to a heater 44 whose output pipe 42 is connected to a hot water supply passageway 41. Those supply passageways are formed in a controller body 47. The body defines a central cavity generally designated 147 in which a piston or spool 55 is reciprocally disposed. The cold water supply passageway includes inlet ports 48 through which cold water flows from the supply passage 46 to the cavity. The hot water supply passageway includes inlet ports 49 by which hot water is admitted from inlet passage 41 to the cavity 49. Hot water exit port 50 and cold water exit port 51 are connected together in a temperature sensing cavity 52. The hot and cold water mixture exits the housing at an outlet 53. Upstream from that outlet, and downstream from the temperature sensing cavity 52, a spring closed, pressure opened, back-pressure valve 54 develops a sufficient back pressure against the flow of hot and cold water through the proportioning valves to insure an adequate flow of water through the bridge circuit which operates to control movement of the spool 55.

The spool is formed with 3 lands identified by the reference numerals 56, 57 and 58 respectively. Land 58 cooperates with the hot water outlet ports 49 and 50 to control the flow of hot water as the spool is reciprocated. Lands 56 and 57 operate together to control the flow of cold water from inlet port 48 to outlet port 51. As the spool is moved progressively to the right from the left-most position it occupies in FIG. 1, there is no flow through the unit until land 57 begins to uncover the inlet port 48. Continued movement of the spool to the right uncovers the inlet port 48 in greater degree and inlet port 49 begins to open. As the spool 55 moves more to the right, land 56 begins to close the cold water outlet port 51 while the inlet and outlet ports 49 and 50 for hot water open more widely. The operation of the valves is reversed as the spool is moved back toward the left.

The spool 55 is the output element of the bridge circuit. Its land 57 and the outer surfaces of lands 56 and 58 are devoted to accomplishment of the purpose of the system. However, the left and right end faces of the spool act as piston faces and serve the same function as do the upper and lower faces of piston or spool 17 in FIG. 1. The right face 60 is subjected to the pressure in chamber 61 whereas the left face 62 of the spool is subjected to the pressure in chamber 63.

Chamber 61 and 63 connect two points in two parallel flowpaths that extend from inlet 40 to outlet 53. The first one of those flowpaths extends from inlet 40 through pipe 45, supply line 46 and a passageway 65 to a fixed restriction 66. Thereafter it extends by a passageway 67 to the chamber 63. From the chamber 63 the first flowpath continues through an orifice 68 past a tapered plug 69 (when the plug is moved to the right by rightward movement of the spool 55) and through a passageway 70 to the outlet 53. The second flowpath begins at inlet 40 and continues through heater 44 to pipe 42 and supply passage 41 and thereafter to passageway 71, fixed restriction 72 and passageway 73 to an intersecting passageway 74 which communicates with chamber 61 of the spool cavity. Below the juncture with connection 74 the passageway is designated 75. Passageway 75 opens to a chamber 76 which has a valve seat 77 formed on one wall of the chamber. The seat surrounds a passageway 78 that continues to a group 80 of control valves. Downstream of the control valves, the second passageway continues through conduit 81 to the outlet 53. Thus, the first and second passageways in FIG. 2 combine with the spool 55, and the cylindrical cavity in which it is disposed, to form a bridge circuit substantially like that shown in FIG. 1.

It will be apparent in FIG. 2 that the two flowpaths of the bridge circuit are no less in parallel if, instead of having actual common interconnection at an identifiable outlet, both would simply exhaust to a drain. It will also be apparent in FIG. 2 that the common inlet for the two flowpaths of the bridge can be removed at a substantial distance, both physically and functionally, from the common connection or fluid source.

The orifice 68 and plug 69 of FIG. 2 correspond to orifice 23 and 24 of FIG. 1. The orifice is surrounded by a valve seat in both instances so that the first flowpath is entirely shut off when the piston moves to an extreme position against that seat. This is one of the features of the invention. By altering the variable restrictor by which control is accomplished the piston can be moved against that seat and flow through the first flowpath can be stopped entirely when the system is to be shut down. The valve seat is identified by the numeral 84 in FIG. 2 and by the numeral 85 in FIG. 1.

The set 80 of control valves includes two two-way valves 87 and 88 and two shut-off valves 89 and 90. The two two-way valves 87 and 88 can be connected in series or parallel with one another and with shut-off valve 89. The shut-off 90 is in parallel with all of them and it will be obvious that this arrangement permits series and parallel control of bridge operation from a number of stations which in practice can be widely separated. Opening one or more of the valves in set 80 permits a relatively large flow from chamber 61 whereby its pressure is reduced. Pressure in chamber 63 will force the spool 55 rightward until the plug 69 is retracted sufficiently to permit a flow through orifice 68 that results in a pressure drop in chamber 63 to the level of the pressure in chamber 61. At that point the spool 55 stops moving and the flow of hot and cold water through ports 48, 49, 50 and 51 will be proportioned according to the position of the spool. The system operates in the manner of the system of FIG. 1. However, whereas valve 18 was in parallel with the restrictor 14 in FIG. 1, in the case of FIG. 2 there is an added restrictor in series with the valves of set 80. The valve head 92 of this added restrictor is attached to the rod 93 of an expandable temperature sensitive element 94 disposed in temperature sensing cavity 52. As the structure of the sensor expands and contracts with temperature, head 92 is moved toward and away from the seat 77. At maximum safe temperature, or other selected temperature value, head 92 approaches seat 77 to limit flow through second flowpath whereby the piston will be forced leftward to limit the portion of hot water in the mixture.

In FIG. 3 the invention is applied to control of the quantity of gas that is permitted to flow from an inlet 100 to an outlet 101. The flow volume varies with the position of the head 102 relative to the seat 103 of a variable shut-off valve contained within the upper part 104 of a controller housing which also includes a lower part 105. The housing 104 and 105 is provided with internal flow passageways that combine with an external conduit or pipe 106 to form an hydraulic bridge similar to those previously described.

Pressure differential in the bridge is made to alter the position of an output element which in this case has the form of a body of liquid, preferably mercury, which is designated by the reference numeral 107. A central wall 108 divides the lower portion of body 105 into two sections. The wall 108 ends short of the lower end of the body 105 whereby communication is afforded from one side of the wall to the other. The body of mercury extends above the lower end of the wall on both sides so that a manometer is formed. A float 109 rests atop the mercury pool at the right side of wall 108 in a cavity 110. On the other side of the wall the cavity above the mercury pool is identified by the reference numeral 111.

The bridge circuit comprises two flowpaths which extend in parallel from inlet 100 to outlet 101. Those two flowpaths begin in chamber 115 which is connected to inlet 100. From that chamber a first flowpath proceeds through a first restriction 116 formed by a small opening connecting chamber 115 with chamber 110. The first flowpath continues from chamber 110 through a variable second restriction which comprises an orifice 217 whose side walls are tapered inwardly to define a flowpath of progressively lesser cross-sectional area in the upward direction. The variable restrictor further comprises a valve head or plug 118 which is carried by the float 119 and is moved when the float moves along the axis of the orifice 217. As the float moves up and down the head 118 moves to different positions within the orifice to change the effective flowpath through the orifice. Beyond the variable restrictor the first flowpath continues to the outlet 101.

The second flowpath begins at chamber 115 and continues to a third restrictor 117 having the form of a small opening in one of the walls of chamber 115. Restrictor 117 opens to chamber 111 and the second flowpath continues from that chamber through the conduit 106 and a fourth restrictor 120, which is variable, to the outlet 101. Since the bridge is in parallel with the main supply line from inlet 100 to outlet 101, no sensing fluid will flow through the bridge if bridge resistance exceeds that of the main flow line in any appreciable degree. Accordingly, to insure that there is flow through the bridge circuitry, a restrictor 121 is included in the main line between inlet 100 and outlet 101 upstream from valve 102 and 103 to develop a back pressure.

If the variable restrictor 120 is adjusted so that its degree of restriction changes, then the pressure in chamber 116 will be altered relative to the pressure in chamber 110. Any difference in pressure in these two chambers results in displacement of the body of mercury 107. As a result of that displacement, the position of float 109 will change and, as a consequence of that, the position of head or plug 118 will change to alter the degree of flow through the first flowpath. The degree of flow is changed until that change results in a pressure in chamber 110 that matches the pressure in chamber 111.

Another variation of the invention is shown in FIG. 4. The apparatus shown in that FIGURE has a full hydraulic sensing and operating control. The apparatus includes a housing shown in cross-section to be divided into several portions. The intermediate portion numbered 122 houses a fluid supply circuit and an output element. The output element introduces a valve action into the fluid supply circuit that varies with the position of the output element. Thus, section 122 is comparable to the intermediate portion of the apparatus of FIG. 2 that houses the supply lines and the spool and those lands of the spool that cover and uncover the main supply ports.

It is the portions of the structure in FIG. 4 that lie above and below that central section that are here described. The apparatus of FIG. 4 is comprised, generally, of lower cap assemblies consisting of inner lower cap and seals 154 and 155, respectively, and outer lower cap 156 and seal 157. It also comprises a sensing valve 179 and upper caps 180, 181 and 187, and associated valves 144 and 145, seals 152 and 153, along with diaphragms 148 and 149. In addition, the apparatus includes a plug or plunger stem 214 which is connected to the movable element and serves as a valve seating means to open or close a fluid entry to a pipe 175.

The pressure sensing device 179 is comprised of a valve body 165, a cap 166 which closes one end of valve body 165, a cap 171 which closes the opposite end of valve body 165 except for a pressure inlet pipe 235. It also comprises a spring 167 which preloads plunger valve 169 and urges the movement of the valve in one direction. A groove 172 in plunger 169 controls the flow rate of the fluid. Ports 164 and 173 in valve body 165 form a flow inlet and outlet.

Plunger 169 is a pressure sensor and is responsive to changes in fluctuations in fluid flow pressure that need to be regulated. Plunger stem 168 acts as a stop against cap 166 when ports 164 and 173 are fully closed in response to maximum fluid pressure. A plunger 169 and groove means 172, modulate the fluid flow rate through port 164 to pipe 173 in response to fluctuations in fluid pressure applied to plunger 169.

Valve 158 is a manually operated throttle valve and is used to manually preset the fluid pressure required or desired.

A pipe 125 is connected to a fluid pressure supply source or inlet. Another pipe 177 carries the used fluid to an outlet at a drain or back to a sump for reuse. Elements 126 and 127 are fluid flow rate restricting means of, generally, equal cross-sectional area. Elements 148 and 149 are diaphragms used to open and close valves 144 and 145. However, other means such as pistons in response to fluid pressure may be used to open or close valves 144 and 145.

Springs 150 and 151 are one form of means for urging valve 144 and 145 to close. The numeral 160 designates a vertical slit, which is one of several forms including a ball and spring which could be used, to serve as a feedback control component which, in conjunction with the movable output element, changes the flow to the variable restrictor whose degree of resistance to flow is variable as the output element changes position. Plug 214 is fixed to the output element of the controller and is moved up and down to alter the degree in which the slit is covered and uncovered whereby flow through it is altered.

The numeral 146 designates a channel extending to the chamber at the upper end of the cavity in which the output element is disposed. Pipe 178 is a fluid by-pass means for channel 162, flare 161 and slit 160, to provide a means for making corrections in fluid pressure when deviations from the pre-set pressure tolerance levels occur and need to be corrected.

In the operation of the valve of FIG. 4, fluid under pressure enters pipe 125, then divides and flows through fluid flow rate restricting means 126 and 127 and on through pipes 131 to throttle valve 158 which is assumed to be closed. Fluid pressure from the source to be controlled also will flow into sensor 179 at its lower inlet and, as a result, force will be applied on plunger 169 and will move and compress spring 167. If the fluid pressure in the pipe is sufficiently high, port 164 in valve body 165 will be closed.

Pressurized fluid also flows through pipe 129, 130, 162, flare 161, slit 160 and is stopped by the plug 214 when it is closed on seat 174. Fluid also enters pipe 164, and is stopped by plunger 169 which is closed. With this condition existing, the pressure in pipes 132 and 133 is balanced and the same pressure is on both sides of diaphragms 148 and 149. With the balance of fluid pressures on both sides of diaphragms 148 and 149, spring pressure from springs 150 and 151 will urge valves 144 and 145 to remain closed. When valves 144 and 145 are closed, the fluid in the output element cavity will prevent the output element 224 from moving upward. When the output element and associated valve elements are down, fluid flow is permitted. To preset the level of fluid pressure desired valve 158 should be opened to the required degree. This action will unbalance the system and fluid will flow through pipes 131 and 159. As a result the pressure in pipe 132 will be reduced and be less than that in pipe 133. Therefore pressure in cavity 139 will be greater than that from pipe 136 so that diaphragm 149 will compress spring 151 and open valve 144. When valve 144 opens fluid will be forced out of the output element cavity by the pressure below the output element. As the output element begins to raise valve stem 214, fluid will begin to flow through slit 160 and into pipe 175, 176 and into pipe 177. The fluid will either go back to the sump for reuse or go back to the drain depending on the application. As valve stem 214 continues to rise, the fluid flow rate from slit 160 increases and more fluid flows into pipe 175 and the pressure in pipes 129, 130, 163 and 162 will be reduced and will continue to lower as more fluid flows through slit 160. When the pressure on the diaphragm in cavity 139 equals the pressure below the diaphragm from pipe 136, pressure from spring 151 will close valve 144, and the output element and stem 214 will become stationary indicating that the position of the valve elements are in the position preset by throttling valve 158. Should the pressure drop slightly from the prescribed setting, the pressure in pipe 235 will be reduced, thus lowering plunger 169 which controls the position of port groove 172 with relation to ports 164 and 173. When the pressure is maximum spring 167 is compressed to the maximum and ports 164 and 173 are closed. As the pressure drops in pipe 235, spring 167 will force plunger 169 downward and more fluid will flow through ports 164, 173, and pipes 170, 178, 175 and 177. The pressure in pipes 129, 130, 162, 133 and particularly 137 which will reduce the pressure in spring cavity below diaphragm 148, so that it is less than the pressure in cavity 130 which is above diaphragm 148. The higher pressure in cavity 138 will begin to open valve 145 and fluid will flow into the output element cavity. The total force on the upper side of the output element from the incoming fluid from channel 146 is then greater than the total force below. It will move downward and reduce the fluid flow rate through the supply passages. This will result in the pressure building up in pipe 235; plunger 169 will therefore rise and reduce the flow through pipes 164 and 173 causing an increase in pressure in 129, 130, 163 and 162. When this occurs, pressure on both sides of diaphragm 148 will approach a balanced condition and spring will close valve 145. The output element then will be stationary. Should the pressure of the fluid flowing out of the supply passage become higher than the preset tolerance levels set by valve 158, the pressure in pipe 235 would increase forcing the plunger upward and compressing spring 167 until spring 167 and plunger 169 pressure is balanced. This movement upward would further restrict the fluid flow through 164, 173, 170, 178, 175 and 177 causing an increase in pressure in diaphragm cavity 139 which will open valve 144. When valve 144 opens, fluid will be forced out of the output element cavity. The output element will move upward to bleed more fluid through the supply passage resulting in less pressure in the fluid whose pressure is being sensed by means of sensor 179. It will be clear that alternately opening and closing valves, as above outlined, will maintain a uniform pressure within operating tolerances.

Although I have shown and described certain specific embodiments of my invention, I am fully aware that many modifications thereof are possible. My invention, therefore, is not to be restricted except insofar as is necessitated by the prior art.

I claim:

1. A fluid pressure responsive position controller comprising:
   an inlet for fluid;
   an outlet for fluid;
   first and second flowpaths connected in parallel with one another from said inlet to said outlet;
   first and second flow restrictors in series, in that order, in said first flowpath between said inlet and said outlet;
   third and fourth flow restrictors in series, in that order, in said second flowpath between said inlet and said outlet;
   an output element capable of being displaced;
   displacement means for displacing said output element in accordance with the difference in fluid pressure between a point in said first flowpath, between said first and second restrictors and a point in said second flowpath between said third and fourth restrictors;
   one of said first and said second restrictors being variable;
   restrictor varying means comprising a connection from said output element to said variable one of said first and second restrictors for varying that restrictor as a function of output element position;
   said variable one of said first and second restrictors comprising a variable orifice means including an orifice and a plug movable relatively to the orifice for altering the area of the flowpath therethrough, said restriction varying means comprising means for moving said plug relative to said orifice;
   said output element comprising the spool, and said displacement means comprising the cylinder and cylinder input and output flow lines, of a double acting spool and cylinder assembly;
   a pair of supply lines each including a flow control valve, said supply lines having common connection downstream of said flow control valves;
   said cylinder being formed with ports connecting to said supply lines and said spool being formed with lands, the flow control valves comprising said ports and said lands; and
   said inlet comprising a pair of inlet flowpaths interconnecting a respectively associated one of said first and second flowpaths with a respectively associated one of said supply lines at a point in said supply line upstream from the flow control valve included in it.

2. The invention defined in claim 1 which further comprises a spring closed, pressure opened, back-pressure valve in series in said outlet.

3. A fluid pressure responsive position controller comprising:
   an inlet for fluid;
   an outlet for fluid;
   first and second flowpaths connected in parallel with one another from said inlet to said outlet;
   first and second flow restrictors in series, in that order, in said first flowpath between said inlet and said outlet;
   third and fourth flow restrictors in series, in that order, in said second flowpath between said inlet and said outlet;
   an output element capable of being displaced;
   displacement means for displacing siad output element in accordance with the difference in fluid pressure between a point in said first flowpath, between said first and second restrictors and a point in said second flowpath between said third and foruth restrictors;
   one of said first and said second restrictors being variable;
   restrictor varying means comprising a connection from said output element to said variable one of said first and second restrictors for varying that restrictor as a function of output element position;
   said position controller comprising a body formed with a cylindrical cavity and two passageways communicating with said cavity at spaced points along its length;
   said output element comprising a spool disposed and reciprocally movable within said cavity intermediate said spaced points, the body forming said cavity and said two flow passageways comprising said displacement means;
   one of said two flow passageways communicating with said cavity by an orifice opening;
   means comprising a plug for varying the flow area through said orifice opening, the plug and said orifice opening comprising said variable one of said first and second restrictors;

said restriction varying means comprising a connection between said spool and said plug;

said body having two supply passageways formed therethrough and communicating with the interior of said cavity at ports formed in the cavity wall;

said spool comprising lands positioned to open and close said ports in a degree variable with displacement of said spool within said cavity;

said supply passageways being interconnected within said body downstream of said cavity, at least that portion of said first flowpath which includes said first restrictor comprising a passageway within said body extending from one of said supply passageways upstream from said cavity to one of said two flow passageways, and at least that portion of said second flowpath which includes said third restrictor being formed within said body as a passageway interconnecting the other of said supply passageways from a point upstream from said cavity to the other of said two flow passageways.

4. The invention defined in claim 3 including a spring closed, pressure opened, back-pressure valve in said two supply passageways at a point downstream from the point in which they are interconnected.

* * * * *